United States Patent
Ohta et al.

[11] Patent Number: 5,143,434
[45] Date of Patent: Sep. 1, 1992

[54] METER FOR AUTOMOBILES

[75] Inventors: Noriaki Ohta; Minoru Iwazaki; Hiroyasu Shiratori, all of Shizuoka, Japan

[73] Assignee: Yazaki Corporation, Tokyo, Japan

[21] Appl. No.: 676,983

[22] Filed: Mar. 29, 1991

[30] Foreign Application Priority Data

Mar. 30, 1990 [JP] Japan ............ 2-32701[U]
Oct. 3, 1990 [JP] Japan ............ 2-103623[U]

[51] Int. Cl.$^5$ .................................. G01D 11/28
[52] U.S. Cl. .......................... 362/29; 362/23; 362/27; 362/28; 362/30; 116/286; 116/288; 116/DIG. 6
[58] Field of Search .......... 362/23, 26, 27, 28, 362/29, 30; 116/286, 287, 288, DIG. 5, DIG. 6, DIG. 36

[56] References Cited

U.S. PATENT DOCUMENTS

| | | | |
|---|---|---|---|
| 4,044,708 | 8/1977 | Klein | 362/29 |
| 4,163,428 | 8/1979 | Ishikawa | 362/29 |
| 4,233,927 | 11/1980 | Oikawa et al. | 116/287 |
| 4,323,951 | 4/1982 | Pasco | 362/26 |
| 4,559,582 | 12/1985 | Scardilli et al. | 362/23 |
| 4,682,177 | 7/1987 | Shimizu | 116/286 |
| 4,860,170 | 8/1989 | Sakakibara et al. | 362/26 |
| 5,047,761 | 9/1991 | Sell | 116/288 |

Primary Examiner—Ira S. Lazarus
Assistant Examiner—Y. Quach
Attorney, Agent, or Firm—Armstrong & Kubovcik

[57] ABSTRACT

The light emitting diode to illuminate the indicating portion of the pointer and the face plate through the light conductive member is fixedly mounted on a drive unit that rotates the pointer shaft according to the amount of a measured quantity. The light emitting diode is installed in center openings formed in the pointer, face plate and light conducting member, the light conducting member being attached to the underside of the face plate to illuminate letters on the face plate. The light emitting portion of the diode is formed cylindrical so as to allow the pointer shaft to be fixed to the pointer inside the hollow portion of the cylindrical light emitting portion, so that light radiated from the light emitting portion is reliably introduced into the indicator portion of the pointer and also to the light conducting member. Thus construction simplifies the power supply path leading from the drive unit to the light emitting diode.

5 Claims, 6 Drawing Sheets

METER FOR AUTOMOBILES

BACKGROUND OF THE INVENTION

1. Field of the Invention

The present invention relates to a meter for automobiles and more particularly to an automotive meter having a self-illuminating pointer.

2. Prior Art

Figure 9:
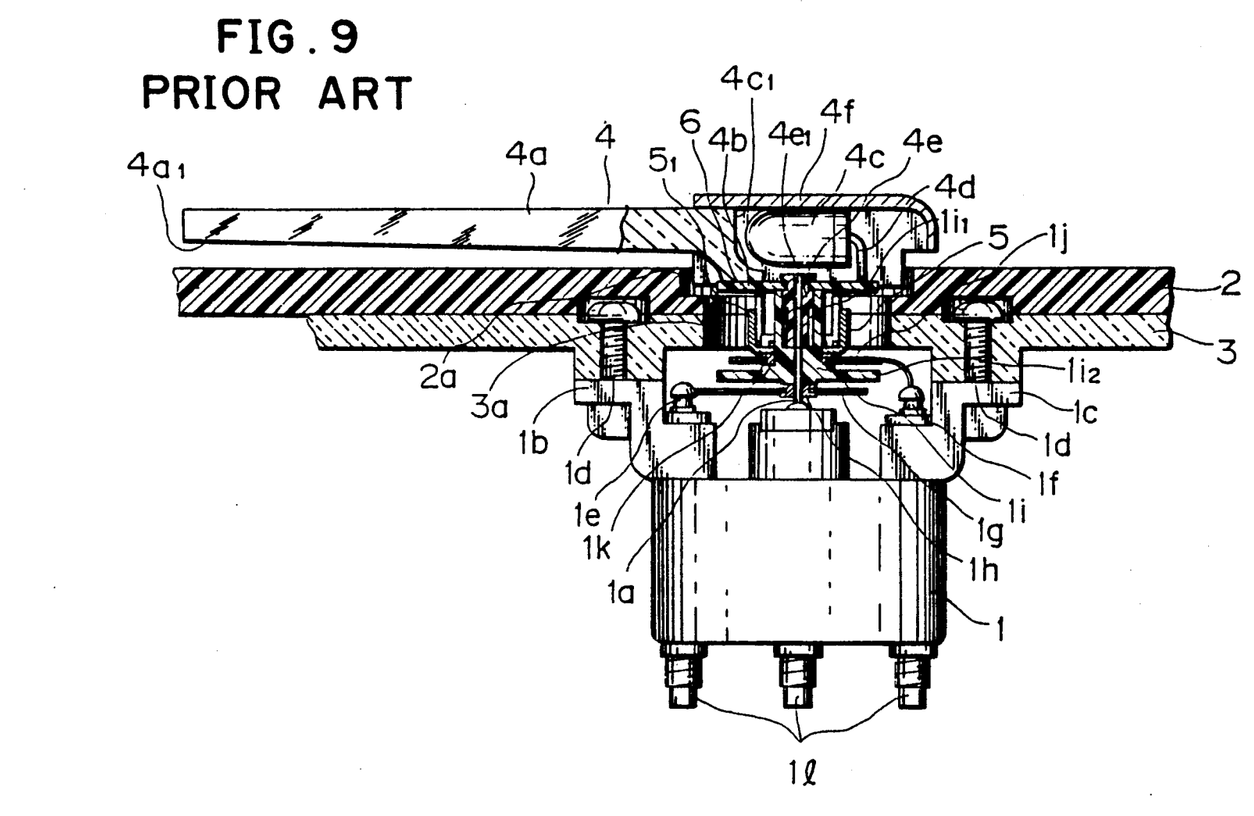
FIG. 9 is a cross section of a conventional automotive meter.

A conventional automotive meter of this kind is illustrated in FIG. 9, in which a light emitting diode is used as a light source for the self-illuminating pointer. In the figure, the meter consists of: a drive unit 1 as a meter body to drive a pointer shaft $1a$ according to the amount of a quantity measured; a face plate 2; a light conducting member 3 arranged at the back of the face plate 2 to illuminate characters and scales printed on the face plate 2; and a pointer 4 securely fixed to the pointer shaft $1a$.

The pointer 4 has an indicating portion $4a$ made of transparent acrylic resin which is inclined upward toward its free end at the underside $4a_1$ that forms a diffused reflection surface. The indicating portion $4a$ has its base portion securely fitted with a printed circuit card $4b$. Mounted on the upper surface of the printed circuit card $4b$ is a light emitting diode $4c$ whose pair of lead terminals $4d$ are connected electrically and mechanically as by solder to a conducting pattern (not shown) on the card $4b$. One end of a pointer collar $4e$ made of conductive material is secured through press fit into the center hole of the printed circuit card $4b$. The pointer collar $4e$ is electrically connected to the conducting pattern on the printed circuit card $4b$ to which one of the lead terminals $4d$ of the light emitting diode $4c$ is connected. The pointer collar $4e$ has a through-hole $4e_1$ passing therethrough, into which the end of the pointer shaft $1a$ is pressed.

The drive unit 1 is mounted to the back of the light conducting member 3 by screws $1d$ at two mounting pieces $1b$, $1c$ so that the pointer shaft $1a$ is situated at the center of an opening $2a$ of the face plate 2 and of an opening $3a$ of the light conducting member 3. At the base of the mounting pieces $1b$, $1c$ a first terminal $1e$ and a second terminal $1f$ are attached. The pointer shaft $1a$ is securely fitted with a connector block $1h$ made of conductive material which connects the inner end of a hair spring $1g$ to the pointer shaft $1a$. The hair spring $1g$ is made of phosphor bronze and acts to reset the pointer 4 to a zero position on the face plate 2. The outer end of the hair spring $1g$ is fixed to the first terminal $1e$.

The pointer shaft $1a$ is also fitted under pressure insulating seat $1i$ formed of insulating material. The insulating seat $1i$ has a through-hole $1i_1$ at the center and a large-diameter flange $1i_2$ formed at the bottom. The through-hole $1i_1$ consists of: a small diameter hollow portion into which the pointer shaft $1a$ is press-fitted; and a large-diameter hollow portion into which a large-diameter portion on a part of the outer circumference of the pointer collar $4e$ is fitted. Fixed to the outer circumference of the insulating seat $1i$ is a connector block $1k$ made of conductive material which connects the inner end of a hair spring $1j$ to the insulating seat $1i$. The outer end of the hair spring $1j$ is secured to the second terminal $1f$. The large-diameter flange $1i_2$ of the insulating seat $1i$ is located between the two hair springs $1g$ and $1j$ to prevent their contact.

A second lead terminal $4d$ of the light emitting diode $4c$ is electrically connected to a conducting pattern (not shown) on the underside of the printed circuit card $4b$, with which one end of a metal coil spring 6 is kept in contact. The coil spring 6 is installed compressed between the underside of the printed circuit card $4b$ and a spring retainer cup 5 made of conductive material, which is mounted on the outer circumference of the insulating seat $1i$ and contacts the connector block $1k$. The spring retainer cup 5 has a side wall $5_i$ slightly larger in inner diameter than the outer diameter of the coil spring 6 so as to stably receive the coil spring 6 for secure electric connection and to prevent it from coming into contact with other parts.

Mounted on the base portion of the pointer 4 is a pointer cap $4f$ which covers a light introducing portion $4c_1$ of the indicating portion $4a$, the light emitting diode $4c$ and the printed circuit card $4b$, blocking them from external view.

Denoted $1l$ are terminals to which input signals for driving the drive unit 1 are supplied.

In the above construction, the first lead terminal $4d$ of the light emitting diode $4c$ is connected to the first terminal $1e$ through the conducting pattern on the upper surface of the printed circuit card $4b$, pointer collar $4e$, pointer shaft $1a$, connector block $1h$ and hair spring $1g$. The second lead terminal $4d$ is connected to the second terminal $1f$ through the conducting pattern on the underside of the printed circuit card $4b$, coil spring 6, spring retainer cup 5, connector block $1k$ and hair spring $1j$.

When a power source is connected between the first and second terminals $1e$, $1f$, current flows through the light emitting diode $4c$ to illuminate it. Light emitted by the light emitting diode $4c$ is directly introduced from the light introducing portion $4c_1$ into the indicating portion $4a$ where it is scattered by the diffused reflection surface at the underside $4a_1$ so that the entire indicating portion $4a$ lights up with a uniform brightness.

The two hair springs $1g$, $1j$ are wound in opposite directions so that, with the pointer 4 set at the zero position on the face plate 2, the torque of the hair spring $1g$ and the torque of the hair spring $1j$ oppose and offset each other to provide only enough restraining torque to the pointer shaft $1a$.

The automotive meter of the above construction is assembled as follows. The drive unit 1, which was already assembled with the connector block $1h$, hair spring $1g$, insulating seat $1i$, connector block $1k$, hair spring $1j$ and spring retainer cup 5, is mounted to the light conducting member 3. Then the coil spring 6 is installed through the openings $2a$, $3a$. The preassembled pointer collar $4e$ of the pointer 4 is fitted under pressure into the through-hole $1i_1$ of the insulating seat $1j$, followed by the end of the pointer shaft $1a$ being pressed into the through-hole $4e_1$ of the pointer collar $4e$. Now, the coil spring 6 is compressed between the printed circuit card $4b$ and the spring retainer cup 5 to achieve a desired electrical connection.

In the aforementioned prior art automotive meter, the pointer 4 incorporates a large number of members not directly related to the meter function just to supply electric power to the light emitting diode $4c$ in the self-illuminating pointer 4 without adversely affecting the pointer driving operation. The large number of components poses many problems such as reducing the assembly efficiency, electric conductivity and economy and degrading the balance of the pointer.

SUMMARY OF THE INVENTION

The present invention has been accomplished to overcome the above drawbacks and its objective is to provide an automotive meter which achieves power supply to the light emitting diode that illuminates the pointer with a small number of components, and which enhances the assembly efficiency of the pointer and also improves the electric conductivity of the conducting path used for supplying electricity to the light emitting diode.

To achieve the above objective, an automotive meter according to this invention comprises: a pointer shaft driven to rotate according to the amount of a measured quantity; a pointer secured to the pointer shaft, said pointer having an indicating portion; a face plate arranged below the pointer; a light conducting member attached to the underside of the face plate, said light conducting member being adapted to introduce light from a light source other than a light emitting diode in order to illuminate letters on the face plate; and a light emitting diode secured to a fixed mounting portion, said light emitting diode having a light emitting portion formed into a cylindrical shape to allow the pointer to be secured to the pointer shaft inside a hollow portion of the cylindrical light emitting portion so that light radiated from the light emitting portion when the light emitting diode is turned on can be introduced into the indicating portion of the pointer to illuminate it.

As another means to accomplish the above objective, an automotive meter of this invention comprises: a pointer shaft driven to rotate according to the amount of a measured quantity; a pointer secured to the pointer shaft, said pointer having an indicating portion; a face plate arranged below the pointer and having an opening at the center; a light conducting member attached to the underside of the face plate and having an opening at the center; and a light emitting diode secured to a fixed mounting portion through the openings in the face plate and the light conducting member, said light emitting diode having a light emitting portion formed into a cylindrical shape to allow the pointer to be secured to the pointer shaft inside a hollow portion of the cylindrical light emitting portion so that light radiated from the light emitting portion when the light emitting diode is turned on can be introduced into the indicating portion of the pointer and into the light conducting member to illuminate the indicating portion of the pointer and letters on the face plate.

In the above construction, since the light emitting diode is secured to the stationary mounting portion, the power supply path leading to the light emitting diode can be made simple. Rigid connection between the pointer shaft and the pointer is made inside the hollow portion of the cylindrical light emitting portion of the light emitting diode, so that even when the pointer is driven and rotated, light from the light emitting portion of the diode can reliably be introduced into the indicating portion of the pointer to illuminate it. The light of the light emitting portion of the diode is also introduced to the light conducting member to illuminate the letters on the face plate.

PREFERRED EMBODIMENTS OF THE INVENTION

Preferred embodiments of this invention will be described by referring to the accompanying drawings.

Figure 1A:
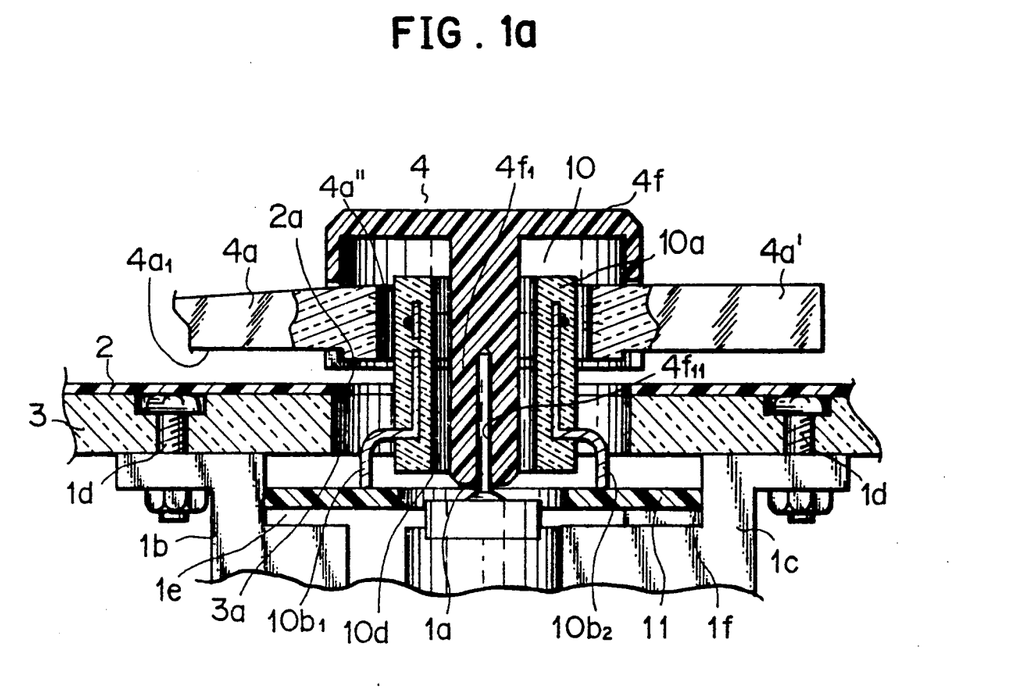
FIGS. 1a and 1b are a cross-sectional view showing an automotive meter as one embodiment of this invention.

FIG. 1a shows one embodiment of the automotive meter according to the invention. Components in FIG. 1a which are identical with those of FIG. 9 are assigned like reference numerals and their explanations are not given.

In FIG. 1a, reference numeral 10 represents a light emitting diode whose light emitting portion 10a is molded of resin and formed into a cylinder. A pair of lead terminals $10b_1$, $10b_2$ of the light emitting diode 10 are electrically connected by solder to a printed circuit card 11 and also mechanically supported on it. The printed circuit card 11 has conductive patterns (not shown) which are electrically connected to first and second terminals 1e, 1f provided to a drive unit 1 (not shown). Formed at the center of the cylindrical light emitting portion 10a of the light emitting diode 10 is a hollow portion 10d, into which a pointer shaft 1a of the drive unit 1 is concentrically inserted. A pointer cap 4f has a mounting projection $4f_1$ protruding downwardly from the center bottom thereof, which is smaller in diameter than the hollow portion 10d. The mounting projection $4f_1$ has a longitudinally extending hole $4f_{11}$ at the center thereof that extends inwardly from the lower end of the projection. The upper end of the pointer shaft 1a is fitted under pressure into the longitudinal hole $4f_{11}$ of the mounting projection $4f_1$, which is disposed inside the hollow portion 10d of the light emitting portion 10a, so that the pointer 4 is secured to the end of the pointer shaft 1a.

The pointer 4 is made of transparent acrylic resin and formed integral with an indicating portion 4a. The pointer 4 also has a balancer portion 4a' extending from the pointer cap 4f in a direction opposite to the indicating portion 4a. Between the indicating portion 4a and the balancer portion 4a' inside the pointer cap 4f is formed a light introducing hole 4a'', which accommodates the light emitting portion 10a of the light emitting diode 10. With the pointer 4 secured to the pointer shaft 1a, the outer circumferential surface of the light emitting portion 10a faces the inner circumferential surface of the light introducing hole 4a'' with a specified gap therebetween.

Figure 2A:
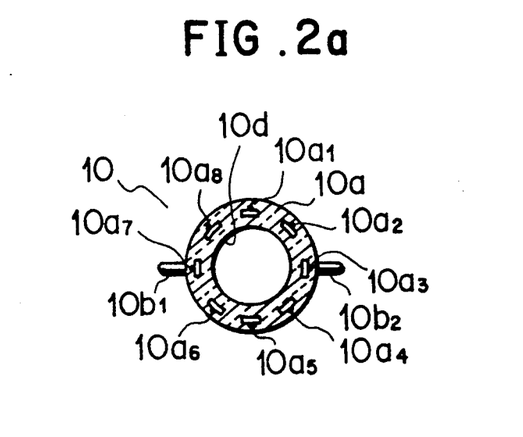
FIGS. 2a and 2b are plan and elevational cross section showing the detailed structure of a light emitting diode of FIG. 1.
Figure 2B:
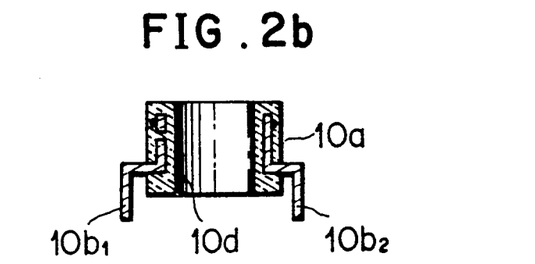
Figure 3:
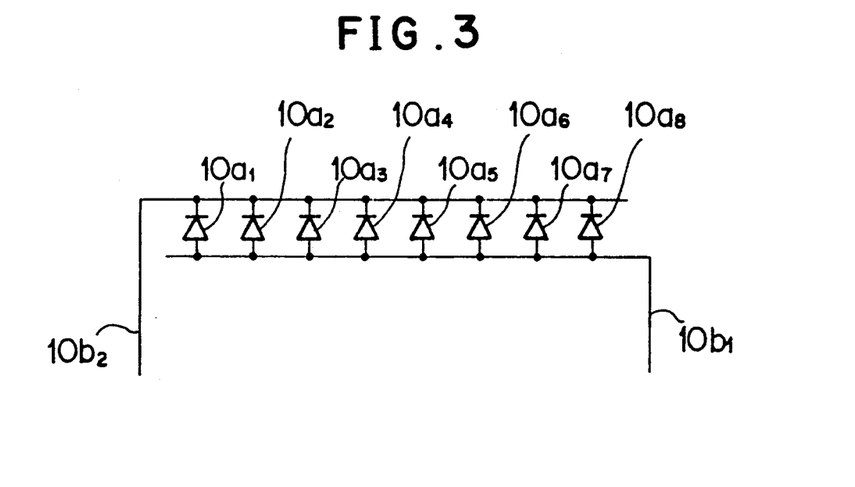
FIG. 3 is a schematic circuit diagram showing an equivalent circuit of the light emitting diode of FIG. 2.

As shown in the plan and cross-sectional views of FIGS. 2a and 2b, the light emitting diode 10 has eight or a plurality of light emitting diode chips $10a_1$ to $10a_8$ arranged at equal intervals in the cylindrical light emitting portion 10a. Each of the light emitting diode chips, as shown in the equivalent circuit of FIG. 3, has its anode and cathode connected to the pair of lead terminals $10b_1$, $10b_2$, so that application of voltage between the lead terminals $10b_1$ and $10b_2$ illuminates all the eight light emitting diode chips $10a_1$ to $10a_8$ simultaneously. Though not shown in detail, the light emitting diode chips or LED chips $10a_1$ to $10a_8$ are electrically connected by bonding to the lead terminals $10b_1$, $10b_2$ in the light emitting portion $10a$ and are so arranged that light generated by the LED chips is radiated from the surface of the light emitting portion $10a$.

Since as mentioned above the cylindrical light emitting diode 10 is fixed inside the drive unit 1, the power supply path to the light emitting diode 10 can be formed simple. Light generated by the light emitting portion 10 is led through the light introducing hole $4a''$ into the indicating portion $4a$ and the balancer portion $4a'$ of the pointer 4 for illuminating thereof. The light emitting portion $10a$ emits light uniformly over the entire circumference through 360°. Hence, as the pointer 4 rotates with the pointer shaft $1a$, driven by the drive unit 1 according to the amount of measured quantity, the amount of light entering the indicating portion $4a$ and the balancer portion $4a'$ does not change as in the case of the conventional apparatus in which the light emitting diode is incorporated in the pointer 4 to make them move together.

Figure 4:
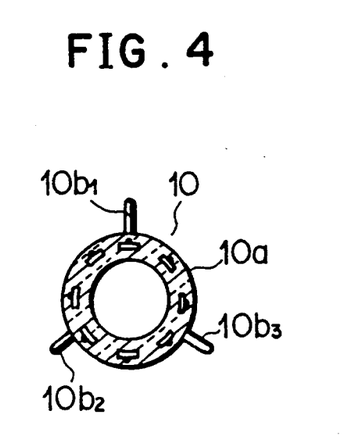
FIG. 4 is a plan view of another example of a light emitting diode.
Figure 5:
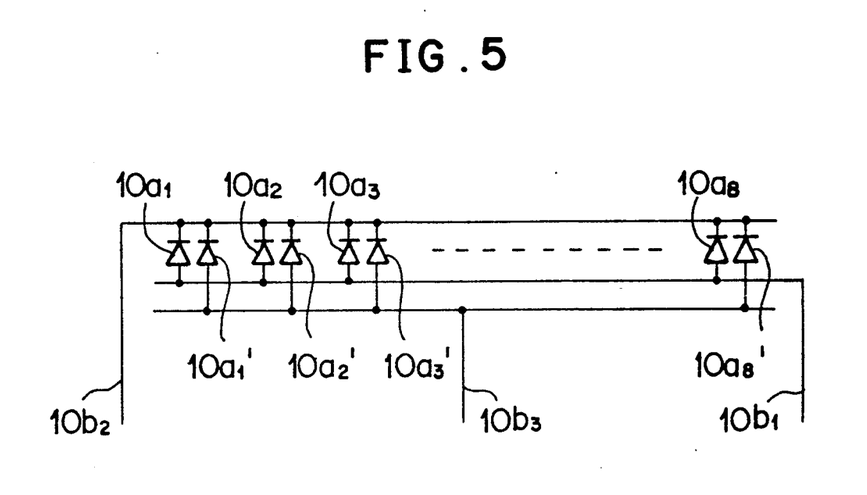
FIG. 5 is a schematic circuit diagram showing an equivalent circuit of the light emitting diode of FIG. 4.

In the above example, the light emitting diode 10 has only a pair of lead terminals and thus can produce a single color of light. It is possible to provide a 3-lead terminal structure consisting of three lead terminals $10b_1$ to $10b_3$, as shown in FIG. 4. As shown in the equivalent circuit of FIG. 5, two LED chips of different colors $10a_1$–$10a_8$ and $10a_1'$–$10a_8'$ are paired in a plurality of sets and incorporated in the light emitting portion $10a$. In this case, the LED chips may be illuminated selectively to produce a desired color or a combination of two colors.

In the example shown, the light emitting diode is mounted on the printed circuit card secured to the drive unit I. The LED and card assembly may be secured to other member than the drive unit I, such as the light conducting member 3.

Next, a second embodiment of the invention will be described.

Figure 1B:
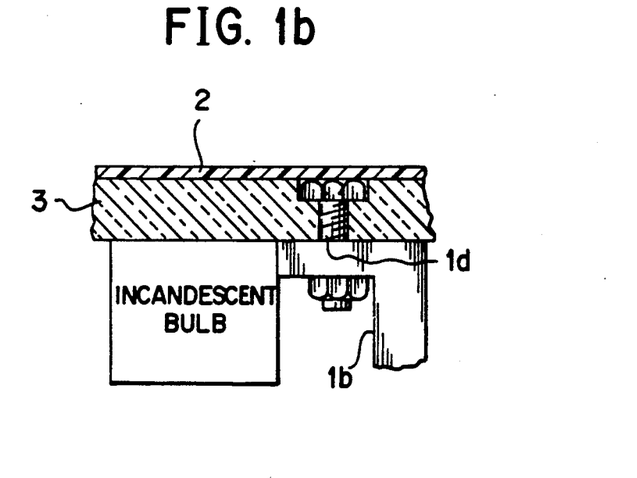
Figure 6A:
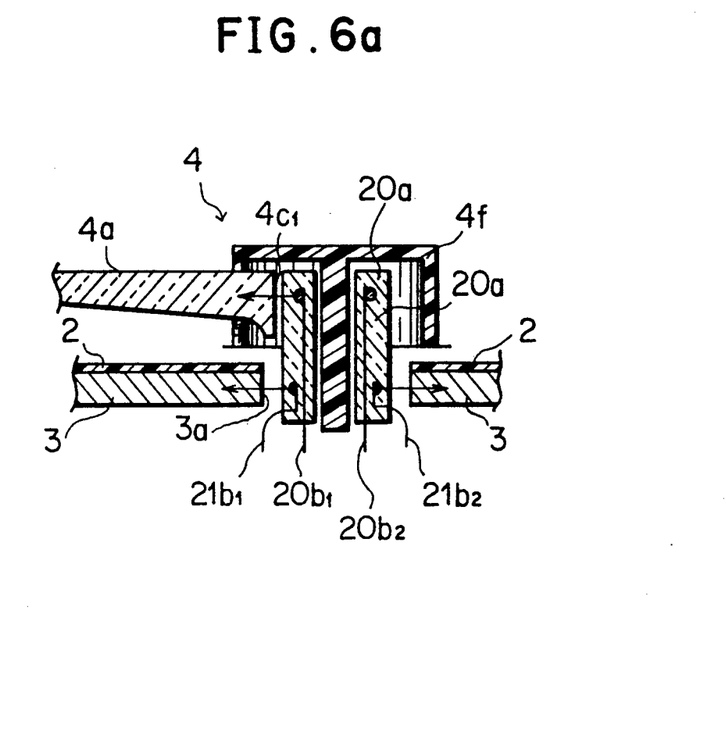
FIGS. 6a and 6b are elevational cross section and plan of an automotive meter as a second embodiment of this invention.
Figure 6B:
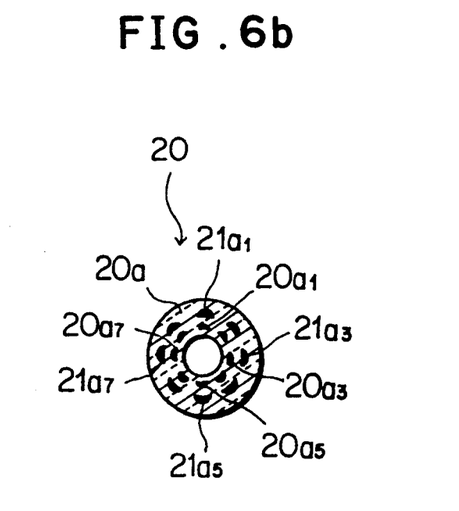

In the automotive meter of the first embodiment, the light from the light emitting portion $10a$ of the light emitting diode 10 is introduced only to the indicating portion $4a$, and the illuminating of the face plate 2 is done by introducing light from an incandescent bulb shown in FIG. 1b, through the light conducting member 3 and onto the face plate 2. On the other hand, in the second embodiment, as shown in FIGS. 6a and 6b, the light from the light emitting portion $20a$ is introduced not only to the indicating portion $4a$ but also to the face plate 2 through the light conducting member 3. In these figures, components identical with those of FIGS. $1a$ and 9 are given the like reference numerals and their descriptions are omitted.

In FIGS. 6a and 6b, denoted 20 is a light emitting diode which has a light emitting portion $20a$ made of resin mold and formed into a cylindrical shape. The cylindrical light emitting portion $20a$ incorporates eight diode chips $20a_1$–$20a_8$ in the upper portion thereof at equal intervals and another eight diode chips $21a_1$–$2a_8$ in the lower portion. These diode chips $20a_1$–$20a_8$, $21a_1$–$21a_8$ are all connected in parallel with an external power source through the lead wires $20b_1$, $20b_2$ and $21b_1$, $21b_2$. The light emitting diode 20 itself is mechanically supported and fixed by these lead wires $20b_1$, $20b_2$ and $21b_1$, $22b_2$ to the printed circuit card (not shown) mounted on the drive unit, as with the preceding embodiment.

With the light emitting diode 20 fixed in this way, the upper diode chips $20a_1$–$20a_8$ are located at the light introducing portion $4c_1$ of the pointer 4 and the lower diode chips $21a_1$–$21a_8$ are situated at the opening $3a$ of the light conducting member 3. When turned on, the light emitting diode 20 illuminates the entire circumference of the cylindrical light emitting portion $20a$ uniformly, with the upper diode chips throwing light to the indicating portion $4a$ as in the first embodiment and with the lower diode chips illuminating the characters on the face plate 2 through the light conducting member 3. It is of course possible to illuminate the pointer 4 and the face plate 2 with different colors.

In the second embodiment, the light emitting diode 20 illuminates not only the indicating portion $4a$ but also the face plate 2. Therefore, as for the indicating portion $4a$, the same effect as in the preceding embodiment is obtained. As to the face plate 2, the light from the light emitting portion $20a$ enters through the entire area of the circular opening $3a$ formed in the light conducting member 3, so that there is no restriction on the light introducing position as is experienced when the light from the incandescent bulb is introduced from the end of the light conducting member. Hence, the meter of this embodiment can show the characters on the face plate 2 with sufficient and uniform brightness.

Figure 7:
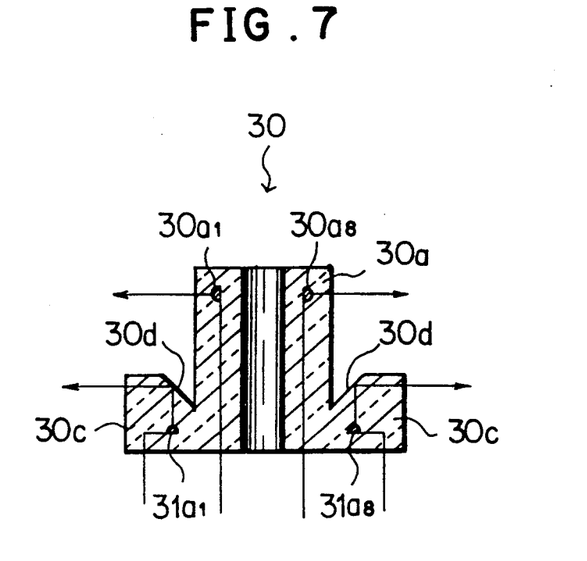
FIGS. 7 and 8 are cross sections of light emitting diodes of different shapes.
Figure 8:
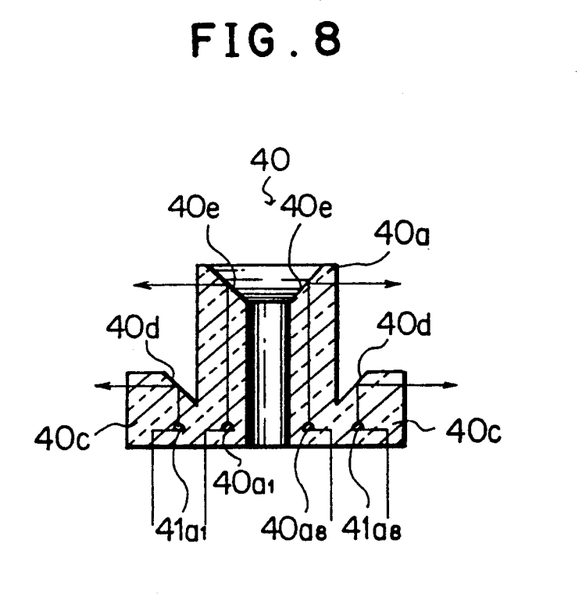

FIGS. 7 and 8 show other examples of the light emitting diode 20 of FIG. 6 employed in the automotive meter.

The light emitting diode 30 of FIG. 7 has its lower portion of the cylindrical light emitting portion $30a$ expanded to a specified thickness and the top inner side of the expanded portion $30c$ is cut off in the shape of a cone to form an inverted conical surface $30d$. The eight diode chips $30a_7$–$30a_8$ for lighting the pointer are arranged at the same positions as in the above-mentioned light emitting diode 20, while the eight diode chips $31a_1$–$31a_8$ for lighting the face plate are located vertically below the inverted conical surface $30d$. When these diode chips $30a_1$–$30a_8$, $31a_1$–$31a_8$ are illuminated, light for the pointer travels horizontally and light for the face plate advances vertically upward toward the inverted conical surface $30d$ of the expanded portion $30c$, by which it is reflected to travel in the horizontal direction. In this way, the pointer 4 and the letters on the face plate 2 are lit.

The light emitting diode 40 in FIG. 8 has its lower portion of the cylindrical light emitting portion $40a$ expanded to a specified thickness and the top inner side of the expanded portion $40c$ is cut off in the shape of a cone to form an inverted conical surface $40d$, as with the preceding example diode of FIG. 7. In addition, the inner side of the top of the cylindrical light emitting portion $40a$ is also cut off in a cone to form an inverted conical surface $40e$. The eight diode chips $40a_1$–$40a_8$ for the pointer are located vertically below the inverted conical surface $40e$ and the eight diode chips $41a_1$–$41a_8$ for the face plate are also arranged vertically below the inverted conical surface $40d$. When these diode chips $40a_1$–$40a_8$, $41a_1$–$41a_8$ light up, light from the two sets of diode chips travels vertically upward to be reflected by the inverted conical surfaces $40e$, $40d$ and move in the horizontal direction, entering the pointer 4 and the light conducting member 3 and illuminating the indicating portion 4a and the letters on the face plate 2.

The advantages of this invention may be summarized as follows.

The power supply path to the light emitting diode 5 can be made simple without degrading the function of illuminating the indicating portion of the pointer. This in turn allows the power supply path to be formed with fewer parts, thereby improving the assembly efficiency of the pointer and the electric conductivity of the power supply path to the light emitting diode.

What is claimed is:

1. A meter for automobiles comprising:
   a pointer shaft driven to rotate according to a measured quantity;
   a pointer secured to said pointer shaft, said pointer having an indicating portion;
   a face plate arranged below the pointer;
   a face plate lighting means;
   a light conducting member attached to an underside portion of said face plate, said light conducting member being adapted to introduce light from said face plate lighting means, said face plate lighting means comprising a light source other than a light emitting diode for illuminating letters on said face plate; and
   a light emitting diode secured to a fixed mounting portion, said light emitting diode having a light emitting portion having a cylindrical shape to allow said pointer to be secured to said pointer shaft inside a hollow portion of said cylindrical light emitting portion so that light radiated from the light emitting portion when said light emitting diode is turned on can be introduced into said indicating portion of said pointer for illuminating said indicating portion.

2. A meter for automobiles comprising:
   a pointer shaft driven to rotate according to an amount of a measured quantity;
   a pointer secured to the pointer shaft, said pointer having an indicating portion;
   a face plate arranged below the pointer and having an opening at a center;
   a light conducting member attached to an underside of the face plate and having an opening at the center; and
   a light emitting diode secured to a fixed mounting portion through the openings in the face plate and the light conducting member, said light emitting diode having a light emitting portion formed into a cylindrical shape to allow the pointer to be secured to the pointer shaft inside a hollow portion of the cylindrical light emitting portion so that light radiated from the light emitting portion when the light emitting diode is turned on can be introduced into the indicating portion of the pointer and into the light conducting member to illuminate the indicating portion of the pointer and letters on the face plate.

3. A meter for automobiles as claimed in claim 2, wherein said light emitting diode consists of a plurality of light emitting diode chips and has a part of the light emitting diode chips arranged in an upper set of an upper part of the cylindrical light emitting portion and remaining light emitting diode chips arranged in a lower set of a lower part thereof so that light from the upper set of the light emitting diode chips is introduced into the indicating portion of the pointer and that light from the lower set of the light emitting diode chips is introduced into the light conducting member.

4. A meter for automobiles as claimed in claim 2, wherein said cylindrical light emitting portion has its lower part expanded to a specified thickness and an inner side of the top of the expanded portion is cut off in an inverted conical shape to form an inverted conical reflection surface to allow the lower set of the light emitting diode chips to be positioned vertically below the inverted conical reflection surface.

5. A meter for automobiles as claimed in claim 4, wherein said cylindrical light emitting portion has an inner side of its upper end cut off in an inverted conical shape to form ah inverted conical reflection surface to allow the upper set of the light emitting diode chips to be positioned vertically below the top inverted conical reflection surface.

* * * * *